April 23, 1940.  R. B. WILLIAMS  2,198,144
BICYCLE SIGNAL SWITCH
Filed Dec. 13, 1938    2 Sheets-Sheet 1

Inventor
R. B. Williams
By Clarence A. O'Brien
and Hyman Berman
Attorneys

April 23, 1940.  R. B. WILLIAMS  2,198,144
BICYCLE SIGNAL SWITCH
Filed Dec. 13, 1938  2 Sheets-Sheet 2

Inventor
R. B. Williams
By Clarence A. O'Brien
and Hyman Berman
Attorneys

Patented Apr. 23, 1940

2,198,144

UNITED STATES PATENT OFFICE 2,198,144

BICYCLE SIGNAL SWITCH

Robert Briggs Williams, East St. Louis, Ill.

Application December 13, 1938, Serial No. 245,545

1 Claim. (Cl. 200—52)

My invention relates to an electric signal conditioned for operation by rearward motion of the chain of the bicycle and is produced by reverse pedalling as in applying the coaster brake of the bicycle, and an important object of my invention is to provide a simple and efficient arrangement of this character.

Other important objects and advantages of my invention will be apparent from a reading of the following description taken in connection with the drawings, wherein for purposes of illustration I have set forth a preferred embodiment of my invention.

Figure 1:
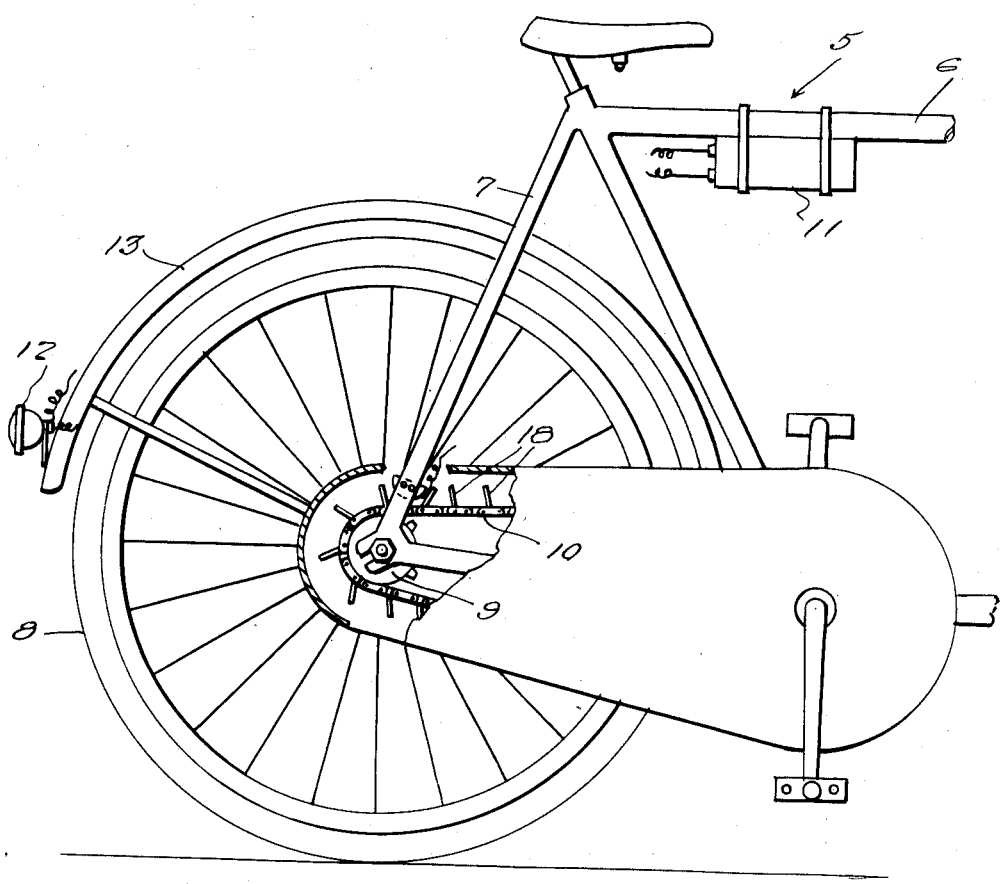
Figure 1 is a general side elevational view partly broken away of a conventional coaster brake equipped bicycle, modified in accordance with the present invention.

Referring in detail to the drawings, the numeral 5 generally designates a conventional bicycle composed of the frame 6 which includes the rear fork 7 between the legs of which is mounted the rear wheel 8 which is equipped with the coaster brake 9 over the rotating element of which is trained the sprocket bicycle chain 10. For convenience a signal operating battery 11 may be mounted on the horizontal bar of the frame 6 and the electrical signal such as a stop light 12 mounted conveniently on the mud guard 13, with suitable wires running between the battery 11, the signal 12, and the switch which is generally designated 14.

Figure 2:
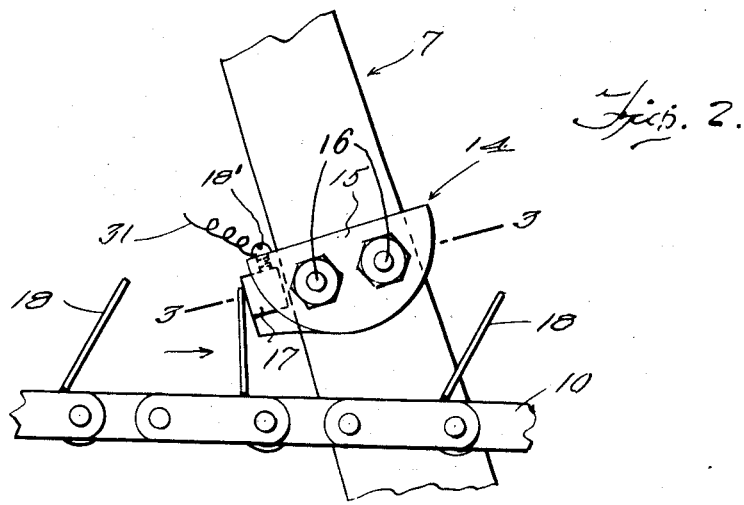
Figure 2 is an enlarged fragmentary side elevational view of the rear fork of the bicycle frame and showing a portion of the chain equipped with contact members for engagement with the switch.
Figure 3:
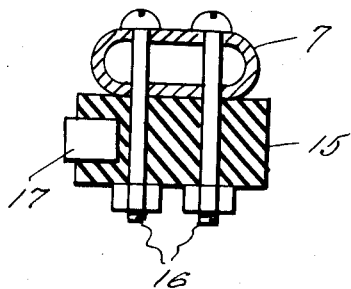
Figure 3 is a horizontal sectional view taken through Figure 2 approximately on the line 3—3.

The switch 14 involves the dielectric block 15 which is preferably in the form of a semi-circular or semi-cylindrical body which is mounted to the inner side of one of the legs of the fork 7 adjacent to and above the upper flight of the sprocket chain 10 as illustrated in Figure 2 of the drawings, with the curved surface directly downwardly, the attachment to the leg of the fork being effected by means of suitable attaching means such as bolts 16 traversing the block and the leg of the fork. Mounted in the front end of the block 15 is the contact 17 which includes a binding post screw 18', the front end of the contact 17 being disposed for engagement by the spring fingers 18 only in a reverse or rearward motion of the sprocket chain 10 on which the spring fingers are mounted.

Figure 4:
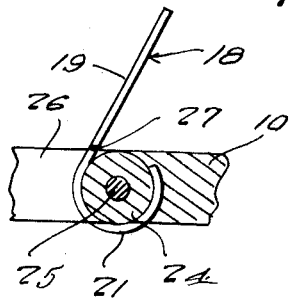
Figure 4 is an enlarged longitudinal sectional view taken through the bicycle chain alongside of one of the spring fingers.
Figure 5:
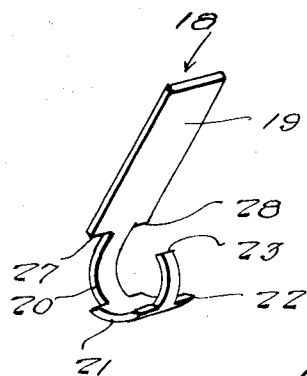
Figure 5 is a prespective view of one of the spring fingers.

Each spring finger is composed of a flat piece of spring conductive material which includes the elongated generally straight rectangular portion 19 and the lower hook-shaped portion 20 which is of less width than the body portion 19 and includes the arcuate ears 21, 22 projecting in laterally opposite directions. The hook portion is approximately two-thirds circular in form and the ears 21 and 22 are located somewhat nearer to the terminal 23 of the hook portion than the point of juncture with the body portion 19, all as illustrated in Figure 5 of the drawings. The hook portion 20 is engaged with the roller element 24 of the sprocket chain, which roller element is held in place by the pin 25 which traverses the sprocket chain and connects adjacent links together, with the lateral ears 21 and 22 engaging the inner sides of the link forming members 26, and with the shoulders 27 and 28 defined at the lower ends of the body portion 19 resting on the top edges of the link forming members 26 as illustrated in Figure 4 of the drawings, whereby the spring contact finger is mounted with the body 19 in a rearwardly inclined position, so that as the upper flight of the sprocket chain 10 moves in the normal forward direction, and the spring fingers engage the curved bottom of the dielectric block 15 the spring fingers will simply be depressed and pass forwardly without coming into engagement with the contact 17. In the reverse or rearward motion of the upper flight of the sprocket chain for a distance at least equal to the space between adjacent ones of the spring fingers, the spring finger has in its normal position a sufficient elevation to engage with the contact 17 and be bent forwardly as illustrated in Figure 2 of the drawings while maintaining engagement with the contact 17. Spring fingers 18 are provided at frequent intervals along the entire length of the sprocket chain 10 so as to be ready for effective action whenever the rider of the bicycle ceases forward pedalling and in the action of applying the coaster brake imparts a rearward or reverse motion to the sprocket chain, especially the upper flight thereof, thereby effecting closing of the switch 14 and energization of the signal 12, to warn following traffic of the intention of the rider of the bicycle to make a maneuver other than continuance of his original forward pace.

Figure 6:
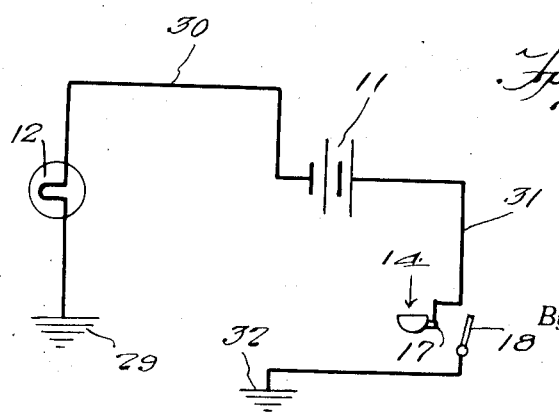
Figure 6 is a schematic diagram showing the electrical connections involved.

Reference to Figure 6 of the drawings indicates that a preferable arrangement of the device of the invention includes the grounding as indicated by the numeral 29 of one side of the signal 12, in this case an electric bulb, the remaining side of the bulb being connected by the wire 30 to one side of the battery 11, the remaining side of the battery 11 being connected by a wire 31 with the contact 17 of the switch 14. The circuit is completed through any one of the spring contact fingers 18 to ground as indicated by the numeral 32, the ground being composed of the frame of the bicycle.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claim.

Having described the invention what is claimed as new is:

In combination, a bicycle or the like including a sprocket chain normally movable in a forward direction and capable of movement in a rearward direction, spring conductive fingers projecting outwardly from the chain, a dielectric block stationarily mounted on the bicycle adjacent and outwardly spaced from a flight of the chain and in the path of the spring fingers, said block having a cam surface arranged to cam the spring fingers in an inward direction while the said flight of the chain is moving in one of said directions, said block having a contact arranged to be electrically engaged by the spring fingers in erect position while the same flight of the chain is moving in the opposite one of said directions.

ROBERT BRIGGS WILLIAMS.